United States Patent
Birru et al.

(10) Patent No.: US 12,548,662 B2
(45) Date of Patent: Feb. 10, 2026

(54) METHOD AND SYSTEM FOR OPTIMAL SCHEDULING OF NURSING SERVICES

(71) Applicants: Dagnachew Birru, Marlborough, MA (US); Timothy Elwell, Marlborough, MA (US); Sofia P Moschou, Reading (GB); Achint Chaudhary, Mumbai (IN)

(72) Inventors: Dagnachew Birru, Marlborough, MA (US); Timothy Elwell, Marlborough, MA (US); Sofia P Moschou, Reading (GB); Achint Chaudhary, Mumbai (IN)

(73) Assignee: QUANTIPHI, INC., Marlborough, MA (US)

( * ) Notice: Subject to any disclaimer, the term of this patent is extended or adjusted under 35 U.S.C. 154(b) by 187 days.

(21) Appl. No.: 18/221,455

(22) Filed: Jul. 13, 2023

(65) Prior Publication Data

US 2023/0360783 A1  Nov. 9, 2023

(51) Int. Cl.
*G16H 40/20* (2018.01)
*G06Q 10/0631* (2023.01)
*G06Q 10/1093* (2023.01)

(52) U.S. Cl.
CPC ....... *G16H 40/20* (2018.01); *G06Q 10/06312* (2013.01); *G06Q 10/1093* (2013.01)

(58) Field of Classification Search
CPC .................................................... G16H 40/20
See application file for complete search history.

(56) References Cited

U.S. PATENT DOCUMENTS

| | | | |
|---|---|---|---|
| 11,264,128 B2 | 3/2022 | Brown et al. | |
| 11,544,603 B1 | 1/2023 | McNair | |
| 2006/0167725 A1* | 7/2006 | Grunspan | G06Q 10/02 705/5 |
| 2007/0194939 A1* | 8/2007 | Alvarez | A61B 5/411 348/E7.086 |

(Continued)

FOREIGN PATENT DOCUMENTS

WO  WO-2012158871 A2 * 11/2012 ........... G06F 19/345

OTHER PUBLICATIONS

Lisa Brandenburg, Patricia Gabow, Glenn Steele, John Toussaint, and Bernard J. Tyson, Innovation and Best Practices in Health Care Scheduling, Institute of Medicine of the National Academies, Feb. 2015. (Year: 2015).*

(Continued)

*Primary Examiner* — Kurtis Gills
(74) *Attorney, Agent, or Firm* — D'Ambrosio & Menon, PLLC; Usha Menon

(57) ABSTRACT

A method and system for optimal scheduling of nursing services in a hospital is provided herein. The method and system comprises forecasting demand for the nursing services for a time interval based on historical data and external data. The method and system further comprises extracting nurses' availability data for the time interval. The method and system comprises aggregating constraints applicable to the nursing services. The method and system also comprises computing a schedule of nurses based on the constraints using at least an optimization model. The method and system further comprises matching the schedule of nurses to the demand based on at least an objective

20 Claims, 10 Drawing Sheets

(56) References Cited

U.S. PATENT DOCUMENTS

| | | | | |
|---|---|---|---|---|
| 2008/0004904 A1* | 1/2008 | Tran | .................. | G16H 40/67 |
| | | | | 340/286.07 |
| 2009/0099862 A1* | 4/2009 | Fireman | ............... | G16H 20/00 |
| | | | | 705/2 |
| 2009/0112618 A1* | 4/2009 | Johnson | ............... | G16H 40/20 |
| | | | | 705/2 |
| 2010/0305966 A1* | 12/2010 | Coulter | ............... | G06Q 10/06 |
| | | | | 705/2 |
| 2014/0136458 A1* | 5/2014 | Levin | ................. | G16H 50/20 |
| | | | | 706/21 |
| 2016/0063192 A1* | 3/2016 | Johnson | ............... | G16H 40/20 |
| | | | | 705/2 |
| 2018/0226151 A1* | 8/2018 | Sharifi Sedeh | ....... | G16H 10/60 |
| 2018/0261319 A1 | 9/2018 | Bowie et al. | | |
| 2021/0193302 A1 | 6/2021 | Day et al. | | |
| 2021/0280302 A1* | 9/2021 | Vontress | ....... | G06Q 10/063118 |
| 2023/0005607 A1* | 1/2023 | Kogan | ................. | G16H 50/20 |

OTHER PUBLICATIONS

Spencer S Jones,"A multivariate time series approach to modeling and forecasting demand in the emergency department", Journal of Biomedical Informatics 42(1):123-39, available at <https://www.researchgate.net/publication/5284484_A_multivariate_time_series_approach_to_modeling_and_forecasting_demand_in_the_emergency_department> Jun. 2008, 18 pages.

* cited by examiner

METHOD AND SYSTEM FOR OPTIMAL SCHEDULING OF NURSING SERVICES

TECHNICAL FIELD OF THE INVENTION

The present disclosure is related to method and system for optimal scheduling of nursing services in a hospital. The optimal scheduling is performed dynamically while incorporating real-time information.

BACKGROUND OF THE INVENTION

The present technologies for optimal scheduling of nursing services in a hospital setting have evolved in response to the increasing complexity and demands of healthcare delivery. These technologies are designed to streamline scheduling processes, improve efficiency, enhance patient care, and support the well-being of nursing staff. Mentioned below is an overview of the background of these technologies.

Shift Scheduling Systems: Shift scheduling systems have been a fundamental technology in healthcare for several decades. Initially, manual methods, such as paper-based schedules or spreadsheets, were used to create nursing schedules. However, these approaches were time-consuming, prone to errors, and did not consider factors such as nurse preferences, workload, and patient needs.

With the advancement of technology, computerized scheduling systems were developed. These systems automated the scheduling process, allowing for efficient allocation of nurses based on predefined criteria. They consider various factors like nurse availability, nurse preferences, skill mix, patient acuity, and regulatory requirements. Modern shift scheduling systems often incorporate features such as shift swapping, self-scheduling options, and real-time updates, enhancing flexibility and nurse satisfaction.

Predictive Analytics and Machine Learning: Predictive analytics and machine learning techniques have emerged as powerful tools for optimizing nursing service scheduling. These technologies leverage historical data, such as patient admissions, acuity levels, and nurse-patient ratios, to develop models that predict nursing demand. By analyzing patterns and trends in the data, these models can forecast future nursing service requirements and optimize scheduling accordingly.

Machine learning algorithms, such as regression models, decision trees, and neural networks, are trained on historical data to learn complex relationships between various factors influencing nursing demand. These models can then generate optimal schedules by considering factors like patient volume, nurse skills, preferences, and workload distribution. The use of predictive analytics and machine learning allows hospitals to proactively address staffing needs, minimize overtime, and ensure adequate coverage for patient care.

Mobile Applications and Communication Tools: Mobile applications and communication tools have revolutionized the way nurses' access and manage their schedules. With the widespread use of smartphones and tablets, nurses can now have real-time access to their schedules, receive notifications about shift changes or updates, and communicate with their colleagues and managers efficiently.

These applications often provide features like shift swapping, self-scheduling, and requesting time-off. They enable seamless communication and collaboration among nursing staff, improving efficiency, and reducing administrative burden. Additionally, mobile applications can integrate with other hospital systems, such as electronic health records (EHRs) or time and attendance systems, allowing for smoother workflow management and data exchange.

Optimization Algorithms and Operations Research: Optimization algorithms and operations research techniques are utilized to solve complex scheduling problems and find the most efficient allocation of nursing resources. These technologies consider multiple constraints, preferences, and objectives to create schedules that minimize costs, maximize staff satisfaction, and ensure high-quality patient care.

These algorithms can handle constraints such as nurse skill mix, legal and contractual requirements, overtime regulations, and patient acuity levels. By formulating scheduling as an optimization problem, these technologies can generate schedules that balance workload, consider nurse preferences, and optimize resource utilization. They provide decision support tools for nurse managers, allowing them to make data-driven and evidence-based scheduling decisions.

In summary, the background of present technologies for optimal scheduling of nursing services in a hospital setting encompasses a shift from manual scheduling methods to computerized systems, the utilization of predictive analytics and machine learning for demand forecasting, the development of mobile applications for real-time access and communication, and the application of optimization algorithms and operations research to solve complex scheduling problems. These technologies aim to enhance efficiency, improve nurse satisfaction, and ensure high-quality care delivery in hospitals.

However, the present solutions for example do not consider multiple objectives such as patient care effectiveness and nurse satisfaction in addition to cost. Additionally, existing scheduling efforts do not consider a dynamically estimated demand based on real-time data.

It is within this context that the present embodiments arise.

SUMMARY

The following embodiments present a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide a method for optimal scheduling of nursing services in a hospital, the method comprising forecasting demand for the nursing services for a time interval based on historical data and external data. The method may include extracting nurses' availability data for the time interval. The method may further include aggregating constraints applicable to the nursing services. The method may include computing a schedule of nurses based on the constraints using at least an optimization model. The method may also include matching the schedule of nurses to the demand based on at least an objective.

According to some example embodiments, the objective is at least one from a group comprising operational cost minimization, nurses' work satisfaction maximization and patient care quality maximization.

According to some example embodiments, the nurses' work satisfaction is computed using surveys.

According to some example embodiments, the optimization model is at least one from a group comprising evolutionary algorithm, reinforcement learning and constrained programming.

According to some example embodiments, the evolutionary algorithm is a genetic algorithm.

According to some example embodiments, the genetic algorithm comprises modeling a set of candidate solutions based on the constraints, the nurses' availability data and the at least an objective. The method may include performing crossover operation on the set of candidate solutions. The method may further include executing mutation operation on the set of candidate solutions. The method may also include repeating the mutation and the crossover operation for multiple generations to obtain the optimal schedule of nurses.

According to some example embodiments, the historical data of the hospital comprises of at least patient orders, acuity levels, patients' census data, departmental data, ICD-10 data, and day of a week.

According to some example embodiments, the external data comprises of at least historical pandemic data, weather data, and historical events.

According to some example embodiments, the time interval comprises or 4 hours, 8 hours, 12 hours, or 24 hours.

According to some example embodiments, the forecasting is online and real-time.

Some example embodiments disclosed herein provide a computer system for optimal scheduling of nursing services in a hospital, the computer system comprises one or more computer processors, one or more computer readable memories, one or more computer readable storage devices, and program instructions stored on the one or more computer readable storage devices for execution by the one or more computer processors via the one or more computer readable memories, the program instructions comprising forecasting demand for the nursing services for a time interval based on historical data and external data. The one or more processors are further configured to extracting nurses' availability data for the time interval. The one or more processors are configured to aggregating constraints applicable to the nursing services. The one or more processors are computing a schedule of nurses based on the constraints using at least an optimization model. The one or more processors are further configured to matching the schedule of nurses to the demand based on at least an objective.

Some example embodiments disclosed herein provide a non-transitory computer readable medium having stored thereon computer executable instruction which when executed by one or more processors, cause the one or more processors to carry out operations for optimal scheduling of nursing services in a hospital. The operations comprising forecasting demand for the nursing services for a time interval based on historical data and external data. The operations further comprising extracting nurses' availability data for the time interval. The operations comprising aggregating constraints applicable to the nursing services. The operations comprising computing a schedule of nurses based on the constraints using at least an optimization model. The operations further matching the schedule of nurses to the demand based on at least an objective.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and still further example embodiments of the present disclosure will become apparent upon consideration of the following detailed description of embodiments thereof, especially when taken in conjunction with the accompanying drawings, and wherein.

Figure 1:
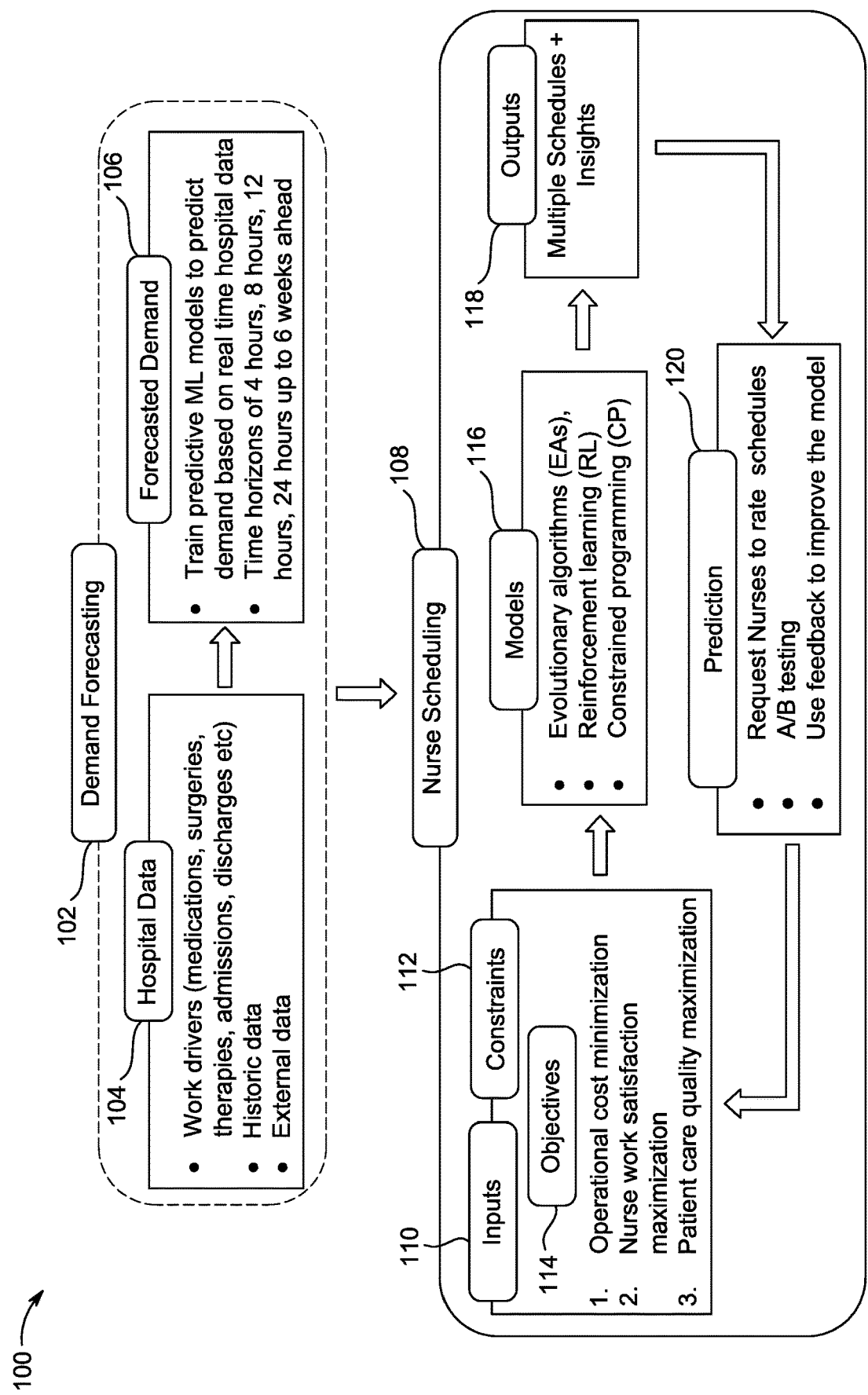
FIG. 1 illustrates optimal scheduling of nursing services in a hospital, in accordance with an example embodiment.

The figures illustrate embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is included in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

Definitions

The term "module" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The term "machine learning model" may be used to refer to a computational or statistical or mathematical model that is trained on classical ML modelling techniques with or without classical image processing. The "machine learning model" is trained over a set of data and using an algorithm that it may use to learn from the dataset.

The term "artificial intelligence" may be used to refer to a model built using simple or complex Neural Networks using deep learning techniques and computer vision algorithms. Artificial intelligence model learns from the data and applies that learning to achieve specific pre-defined objectives.

End of Definitions

Embodiments of the present disclosure may provide a method, a system, and a computer program product for optimal scheduling of nursing services in a hospital. The method, the system, and the computer program product for optimal scheduling of nursing services in a hospital are described with reference to FIG. 1 to FIG. 10 as detailed below.

Optimal scheduling of nursing services in a hospital setting can be achieved through the implementation of various solutions that leverage technology, data analysis, and process optimization. Some key solutions include are mentioned below.

Automated Scheduling Systems: Implementing automated scheduling systems allows for efficient allocation of nursing staff based on predefined criteria and rules.

Predictive Analytics and Forecasting Models: Utilize predictive analytics and forecasting models to estimate nursing service demand accurately.

Machine Learning Optimization Algorithms: Employ machine learning optimization algorithms to solve complex scheduling problems and find optimal solutions.

Real-Time Monitoring and Adjustments: Implement real-time monitoring systems to track changes in patient volume, acuity, or unexpected events.

Self-Scheduling and Shift Swapping: Offer self-scheduling options and shift swapping mechanisms that empower nurses to have more control over their schedules.

Collaborative Communication Platforms: Utilize collaborative communication platforms to facilitate efficient communication among nursing staff and managers using real time reporting and alerting systems that can respond to real-time changes.

Continuous Evaluation and Feedback: Regularly evaluate and collect feedback on the scheduling processes from nursing staff and stakeholders.

Data-Driven Decision Making: Embrace a data-driven approach to scheduling by leveraging data analytics and reporting tools.

FIG. 1 illustrates a block diagram for optimal scheduling of nursing services in a hospital, in accordance with an example embodiment.

In an embodiment, a hospital has a system 100, which is further divided into a demand forecasting module 102 and a nurse scheduling module 108.

Further, the demand forecasting module 102 utilizes hospital data 104 and produces the forecasted demand 106.

In an example embodiment, hospital data 104 plays a crucial role in nursing services demand forecasting. Further, the hospital data may comprise of work drivers, historic data, and external data. Also, the work drivers may include medications, nursing notes, surgeries, therapies, admissions, and discharges. To accurately predict future demand for nursing services, hospitals rely on various types of data that provide insights into patient admissions, length of stay, patient acuity levels, nursing workload, and other relevant factors.

Firstly, patient admission data is essential for understanding the overall volume of patients entering the hospital. This data includes information about the number of patients admitted to the hospital and discharged from the hospital within a specific period. By analyzing historical patient admission data, hospitals can identify trends, patterns, and variations in patient volumes, enabling them to anticipate future demand for nursing services.

Length of stay data provides insights into the duration of patients' hospital stays. Hospitals track the length of stay for each patient, which helps in estimating the average length of stay for different patient categories or medical conditions. This data is crucial for determining the nursing resources required to provide care for patients during their hospitalization.

Patient acuity data is another vital component of nursing services demand forecasting. Acuity refers to the complexity and intensity of care required by patients. Hospitals collect data on patient acuity levels, which can be determined based on various factors such as medical conditions, treatments, diagnosis, co-morbidities, and interventions. Understanding the distribution of patient acuity levels allows hospitals to allocate nursing resources according to the level of care required by patients.

Nursing workload data provides insights into the tasks and activities performed by nursing staff. This data helps in assessing the amount of time and effort required by nurses to deliver care to patients. By analyzing nursing workload data, hospitals can determine the appropriate staffing levels to ensure adequate coverage and high-quality care.

In addition to these specific patient-related data, hospitals also consider external factors that may influence nursing services demand. This includes data related to healthcare policies, workflow requirements, regulations, technology, reimbursement models, nursing unit stress, experience levels of the nurses, leadership, the financial condition of the hospital, population demographics, socio-economic factors, and disease outbreaks. Monitoring and analyzing these external factors help hospitals make informed projections about future demand for nursing services.

Technology and process data are also important in nursing services demand forecasting. Hospitals collect data on the implementation of healthcare technologies, such as electronic health records or automated systems, which can impact nursing workflows and workload. Understanding the impact of technological advancements and process changes allows hospitals to adjust their forecasting models to account for these factors.

Collaborative data involving the input of nursing managers, frontline nurses, and other healthcare professionals is invaluable in nursing services demand forecasting. These individuals provide valuable insights into unit-specific demands, upcoming projects, or changes in patient care requirements. By incorporating their expertise and experience, hospitals can enhance the accuracy of their demand forecasting models.

To analyze and make sense of this vast amount of data, hospitals often employ advanced analytics techniques and forecasting models. These models help identify patterns, trends, and correlations within the collected data, improving the accuracy of demand forecasts.

Therefore, nursing services demand forecasting in hospitals relies on a diverse range of data. Patient admission data, length of stay data, patient acuity data, nursing workload data, external factors data, technology and process data, and collaborative data all play crucial roles in accurately predicting the future demand for nursing services. By analyzing and incorporating these types of data into forecasting models, hospitals can effectively allocate resources, plan staffing schedules, and ensure high-quality patient care.

In an embodiment, nurse scheduling 108 has multiple modules such as inputs 110, constraints 112, objectives 114, models 116, outputs 118 and nurse survey feedback 120.

In an embodiment, the inputs 110 may be the historical data and the external data. Further, the objectives 114 are multiple such as but not limited to operational cost minimization, nurses' work satisfaction maximization and patient care quality maximization. Additionally, the constraints 112 may be the hard constraints, may include but not limited to days off, minimum cover and contract and the soft constraints, may include but not limited to shift on, shift off and optional cover.

The model 116 may be evolutionary algorithm and particularly genetic algorithm. In other example embodiments, other models such as reinforcement learning, or constrained programming may be used.

The output 118 is generated in terms of multiple schedules and insights.

Further, may involve obtaining feedback 120 of the nurses on the output. In an embodiment, the feedback mechanism may include requesting nurses to rate schedules, A/B testing and thereby, using feedback to improve the model.

The dynamic nurse scheduling system is based on demand as forecasted by machine learning models using real-time hospital and external data.

Also, nurse scheduling may be based on multiple machine learning models and trained for each nursing unit individually.

Additionally, iterative evaluation and optimization of scheduling algorithm is performed based on hospital business intelligence analytics and in some instances expert feedback. In an embodiment, the expert may be at least one of nurses, schedulers, and leadership for each nursing unit.

Furthermore, continuous model monitoring and retraining is executed in case metrics drift away.

Figure 2:
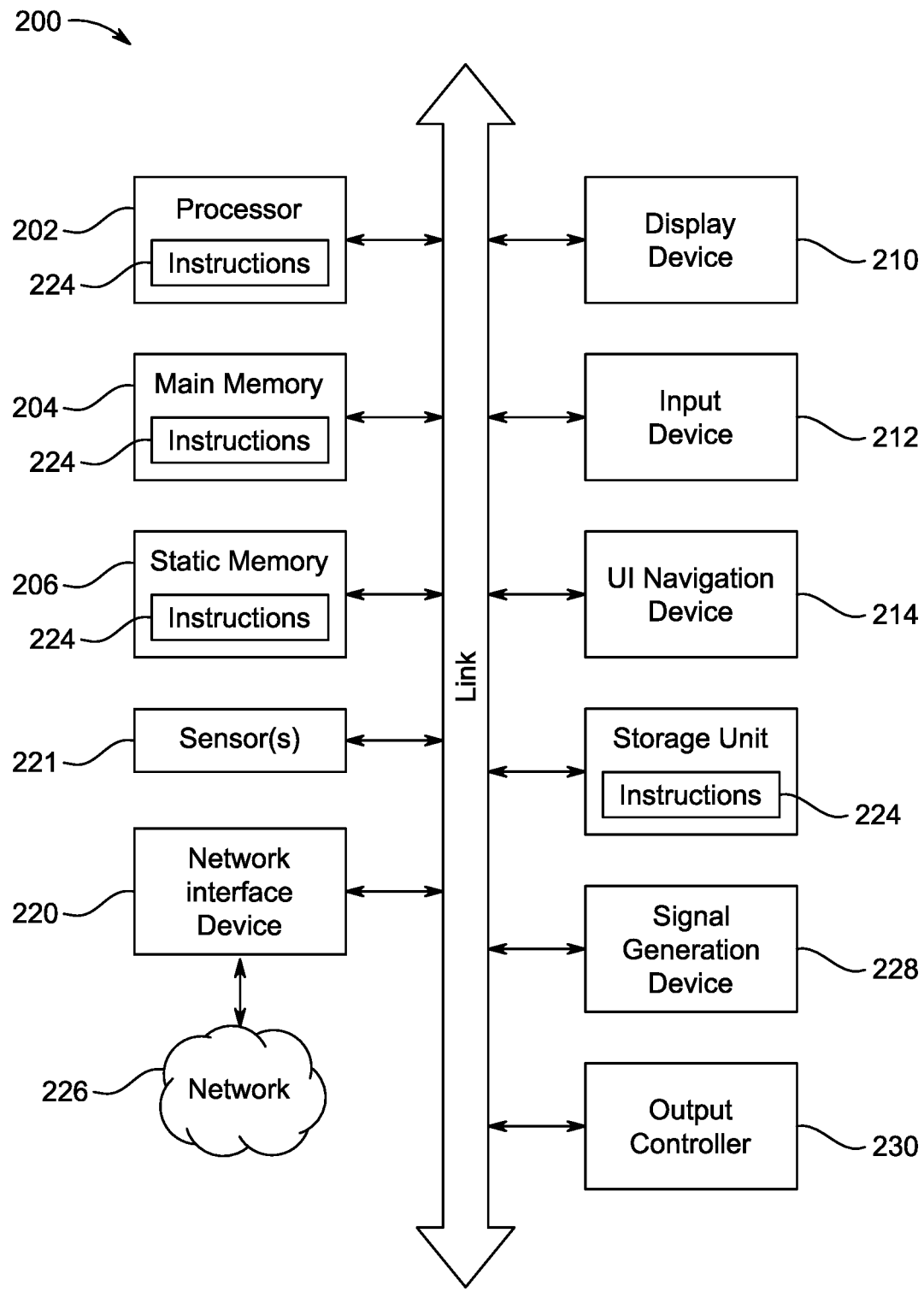
FIG. 2 illustrates a block diagram of an electronic circuitry for optimal scheduling of nursing services, in accordance with an example embodiment.

FIG. 2 illustrates a block diagram of an electronic circuitry for identifying optimal utterances for virtual agent training. The machine of FIG. 2 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 2 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 200 includes at least one processor 202 (e.g., a central processing unit (CPU), a graphics processing unit (GPU), advanced processing unit (APU), or combinations thereof), one or more memories such as a main memory 204, a static memory 206, or other types of memory, which communicate with each other via link 208. Link 208 may be a bus or other type of connection channel. The machine 200 may include further optional aspects such as a graphics display unit 210 comprising any type of display. The machine 200 may also include other optional aspects such as an alphanumeric input device 212 (e.g., a keyboard, touch screen, and so forth), a user interface (UI) navigation device 214 (e.g., a mouse, trackball, touch device, and so forth), a storage unit 216 (e.g., disk drive or other storage device(s)), a signal generation device 218 (e.g., a speaker), sensor(s) 221 (e.g., global positioning sensor, accelerometer(s), microphone(s), camera(s), and so forth), output controller 228 (e.g., wired or wireless connection to connect and/or communicate with one or more other devices such as a universal serial bus (USB), near field communication (NFC), infrared (IR), serial/parallel bus, etc.), and a network interface device 220 (e.g., wired and/or wireless) to connect to and/or communicate over one or more networks 226.

Executable Instructions and Machine-Storage Medium

The various memories (i.e., 204, 206, and/or memory of the processor(s) 202) and/or storage unit 216 may store one or more sets of instructions and data structures (e.g., software) 224 embodying or utilized by any one or more of the methodologies or functions described herein. These instructions, when executed by processor(s) 202 cause various operations to implement the disclosed embodiments.

Example Machine Architecture and Machine-Readable Medium

FIG. 2 illustrates a representative machine architecture suitable for implementing the systems and so forth or for executing the methods disclosed herein. The machine of FIG. 2 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 2 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

As used herein, the term "network" may refer to a long-term cellular network (such as GSM (Global System for Mobile Communication) network, LTE (Long-Term Evolution) network or a CDMA (Code Division Multiple Access) network) or a short-term network (such as Bluetooth network, Wi-Fi network, NFC (near-field communication) network, LoRaWAN, ZIGBEE or Wired networks (like LAN, el all) etc.).

As used herein, the term "computing device" may refer to a mobile phone, a personal digital assistance (PDA), a tablet, a laptop, a computer, VR Headset, Smart Glasses, projector, or any such capable device.

As used herein, the term 'electronic circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 3:
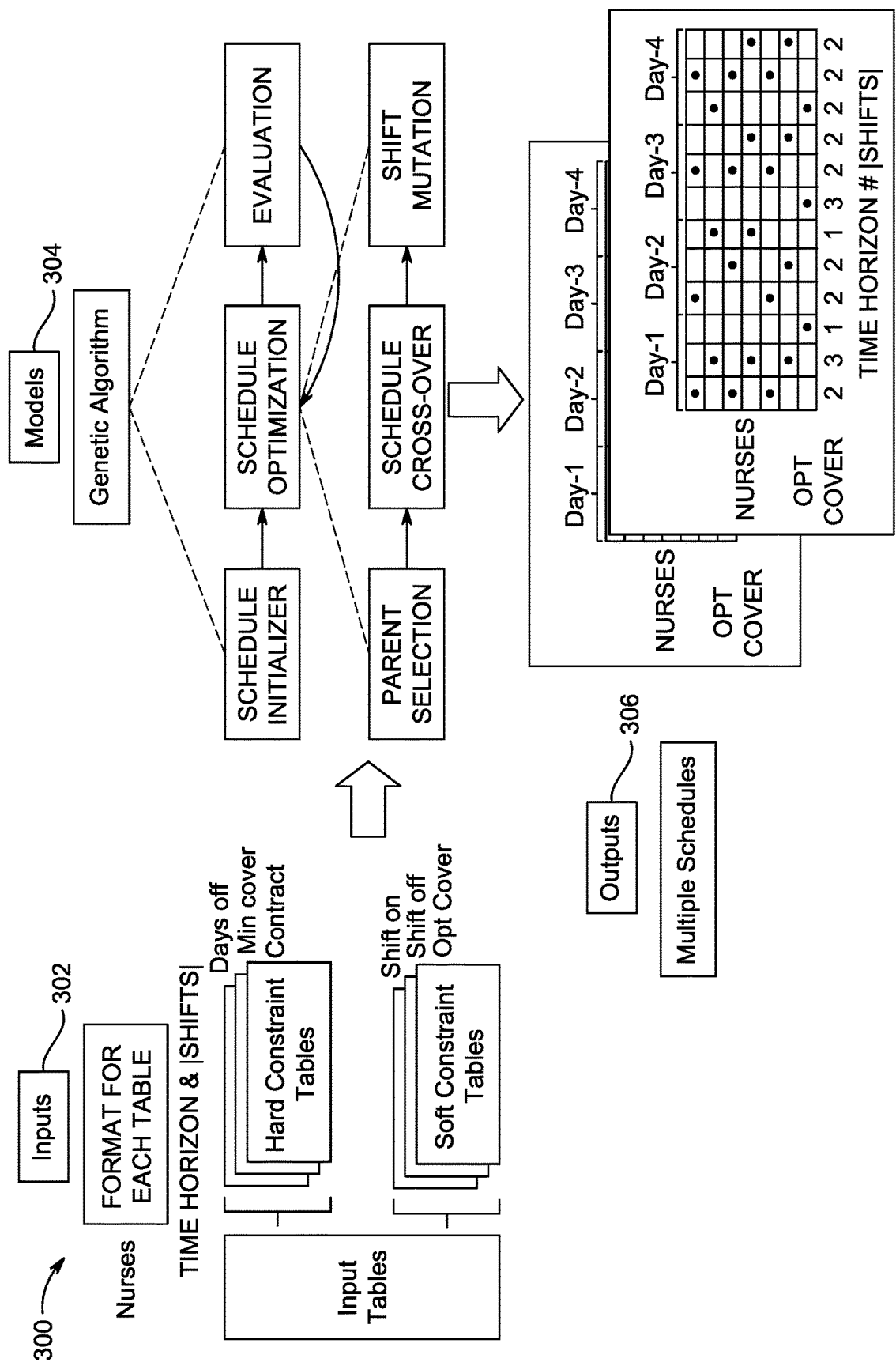
FIG. 3 illustrates a block diagram for modules interacting in optimal scheduling of nursing services, in accordance with an example embodiment.

FIG. 3 illustrates a block diagram for modules interacting in optimal scheduling of nursing services, in accordance with an example embodiment. In the modules interacting in optimal scheduling 300 there are further components input 302, model 304 and output 306.

In an example embodiment, input 302, model 304, and output 306 modules play a crucial role in enabling optimal scheduling of nursing services in a hospital setting. Mentioned below are how each of these modules contributes to the scheduling process:

Input Module: The input module collects and processes the relevant data needed for scheduling nursing services. It includes various components such as:

Historical Data: This includes historical patient admission data, patient acuity levels, nurse-patient ratios, staffing levels, and other relevant data. Historical data provides insights into demand patterns and helps in forecasting future nursing needs.

Staffing Policies and Regulations: Input module incorporates information about staffing policies, contractual obligations, legal requirements, and regulatory guidelines. These factors influence the scheduling process and ensure compliance with labor laws and quality standards.

Nurse Availability and Preferences: It captures information about nurse availability, skill sets, certifications, and preferences. This data helps in creating schedules that align with individual nurse preferences while considering their availability and skills.

Model Module: The model module utilizes advanced algorithms, techniques, and optimization methods to process the input data and generate optimal schedules. Key components of the model module include:

Demand Forecasting: The model leverages predictive analytics and forecasting techniques to estimate future nursing service demand based on historical data patterns. It helps in determining the required staffing levels for different shifts and time frames.

Optimization Algorithms: Model module utilizes optimization algorithms such as linear programming, genetic algorithms, or simulated annealing to solve complex scheduling problems. These algorithms consider various constraints, preferences, and objectives to generate schedules that optimize resource allocation, minimize costs, and ensure sufficient coverage.

Nurse Preferences and Constraints: The model incorporates nurse preferences, constraints, and qualifications to create schedules that align with individual nurse needs while adhering to staffing policies and regulations.

Output Module: The output module presents the final schedules generated by the model module and provides relevant information to stakeholders. It includes components such as:

Nurse Schedules: The output module displays the finalized schedules for nursing staff, indicating the assigned shifts, working hours, and any special considerations.

Communication and Distribution: The output module facilitates the communication and distribution of schedules to nursing staff. It may involve email notifications, mobile applications, or web portals that provide access to individual schedules.

Reporting and Analytics: The output module generates reports and analytics on key scheduling metrics such as staffing levels, overtime hours, shift coverage, and compliance with regulations. These reports help in evaluating the effectiveness of the scheduling process and identifying areas for improvement.

By integrating input, model, and output modules, optimal scheduling of nursing services can be achieved. The input module ensures the availability of accurate and relevant data, the model module applies advanced algorithms to generate optimal schedules, and the output module presents the final schedules and facilitates communication. This holistic approach enables efficient allocation of nursing resources, improved staff satisfaction, and enhanced patient care in the hospital setting.

Figure 4:
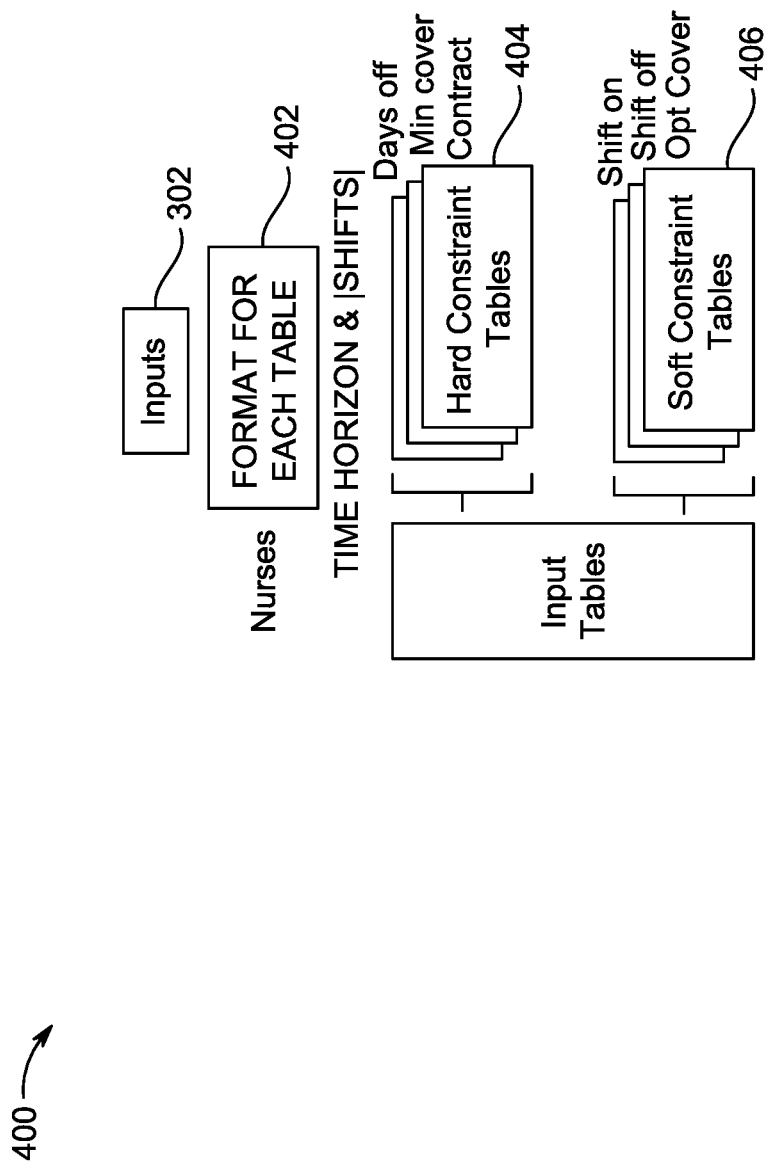
FIG. 4 illustrates a block diagram that shows components of input module, in accordance with an example embodiment.

FIG. 4 illustrates a block diagram that shows components of input module, in accordance with an example embodiment. The input module 400 comprises of formats 402, hard constraints 404 and soft constraints 406.

In an embodiment, the formats 402 is in form of a table with names of the nurses in rows and time horizon in the columns.

In an embodiment, the hard constraints 404 may include but not limited to days off, minimum cover and contract.

In an embodiment, the soft constraints 406 may include but not limited to shift on, shift off and optional cover.

In an example embodiment, In the context of optimal scheduling of nursing services, there are various hard and soft constraints that need to be considered. These constraints ensure compliance with regulations, address staff preferences, and ensure high-quality patient care. Below mentioned are some examples of hard and soft constraints:

Hard Constraints 404:

Minimum Staffing Requirements: Hospitals must meet certain minimum staffing requirements mandated by regulatory bodies or accreditation standards to ensure patient safety and quality of care.

Nurse Certifications and Qualifications: Assigning nurses to specific shifts or units based on their certifications and qualifications is a hard constraint. Certain units or patient populations require specialized training and skills.

Legal and Contractual Obligations: Staffing schedules must adhere to labor laws, contractual agreements, and collective bargaining agreements governing working hours, breaks, overtime, and rest periods.

Patient-to-Nurse Ratios: Hospitals must adhere to specific patient-to-nurse ratios defined by regulatory agencies or professional organizations. These ratios ensure appropriate staffing levels to deliver safe and effective care.

Work Hour Restrictions: There are often limitations on the number of consecutive work hours, maximum hours per week, and mandatory rest periods between shifts to prevent fatigue-related errors and promote the well-being of nursing staff.

Soft Constraints 406:

Nurse Preferences: Consideration of nurse preferences for specific shifts, days off, or work patterns is a soft constraint. Accommodating preferences can improve nurse satisfaction, morale, and work-life balance.

Skills and Expertise: Assigning nurses to units or shifts based on their expertise or interest can improve patient outcomes and efficiency. Matching nurses' skills with patient acuity levels and unit requirements is a soft constraint.

Shift Rotations and Fairness: Maintaining fairness in shift assignments and ensuring equitable distribution of desirable and less desirable shifts among nursing staff is important for morale and reducing dissatisfaction.

Continuity of Care: Ensuring continuity of care for patients by assigning the same nurses to specific patients or units whenever possible can enhance communication, familiarity, and quality of care.

Time-Off Requests: Considering time-off requests and granting reasonable time-off for nurses based on their personal needs and preferences is a soft constraint that promotes work-life balance.

Seniority and Experience: Taking into account seniority or experience levels when making shift assignments can be a soft constraint, recognizing the value of expertise and providing growth opportunities for nurses.

These hard and soft constraints shape the scheduling process and help in balancing regulatory requirements, staff preferences, and patient needs. Optimal scheduling of nursing services involves finding a balance that meets the operational and regulatory demands while considering the well-being and preferences of nursing staff, ultimately resulting in high-quality patient care.

Figure 5:
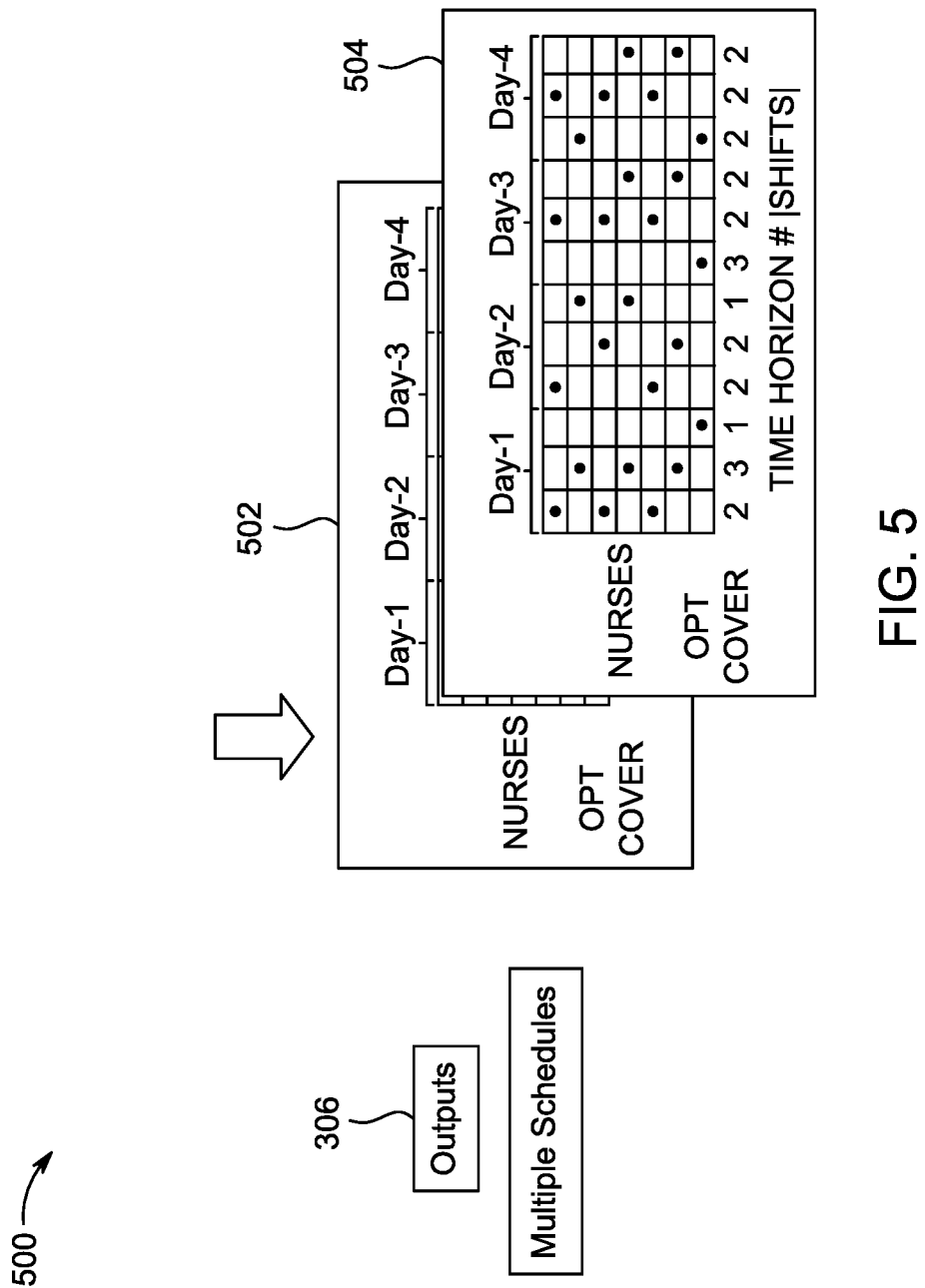
FIG. 5 illustrates a block diagram that shows components of output module, in accordance with an example embodiment.

FIG. 5 illustrates a block diagram that shows components of output module, in accordance with an example embodiment. The output module 500 comprises of multiple tables 502, 504 which contain the names of the nurses and the time horizon in shifts.

In an example embodiment, for presenting the optimal scheduling of nursing services in a table format, several key pieces of information can be included. Mentioned below are some examples of table formats used for scheduling purposes:

Daily Schedule Table: This table provides a detailed overview of the nursing schedule on a daily basis. It typically includes columns such as:

Date: The specific date for the schedule.

Shifts: Different shifts or time slots, such as morning, afternoon, evening, or night shifts.

Nurse Assignments: Names or identifiers of nurses assigned to each shift.

Units/Departments: The specific unit or department where the nurses are assigned.

Notes: Any additional notes or remarks regarding specific assignments or requirements.

Weekly/Monthly Schedule Table: This table presents a broader view of the nursing schedule over a week or a month. It includes columns such as:

Dates: The dates covered within the schedule period.

Nurses: Names or identifiers of nurses assigned to each day or shift.

Shifts: Different shifts or time slots represented by columns.

Units/Departments: The specific unit or department where the nurses are assigned for each shift.

Total Hours: The total number of hours each nurse is scheduled to work within the specified period.

Overtime: Indication of any overtime hours worked by nurses.

Nurse Availability Table: This table displays the availability of nurses during specific time slots or days. It includes columns such as:

Nurse Names: Names or identifiers of nurses.

Days/Time Slots: Specific days or time slots represented by columns.

Availability Status: Indication of whether the nurse is available or unavailable during each time slot.

Preferences: Any specific preferences or restrictions mentioned by the nurse regarding availability.

Skill Matrix Table: This table highlights the skills and qualifications of nurses, helping to match their expertise with specific units or tasks. It includes columns such as:

Nurse Names: Names or identifiers of nurses.

Skills/Qualifications: Different skills or qualifications possessed by nurses, represented by columns.

Competency Level: Indication of the competency or proficiency level of each nurse for each skill.

Time-Off Requests Table: This table captures the time-off requests submitted by nurses. It includes columns such as:

Nurse Names: Names or identifiers of nurses.

Requested Dates: The specific dates requested for time off.

Reason: The reason provided by the nurse for the time-off request.

Approval Status: Indication of whether the request has been approved or denied.

These table formats provide a structured and organized way to present the optimal scheduling of nursing services, including information about shifts, nurse assignments, availability, skills, time-off requests, and more. The specific format used may vary depending on the requirements and preferences of the hospital or scheduling system in use.

Figure 6:
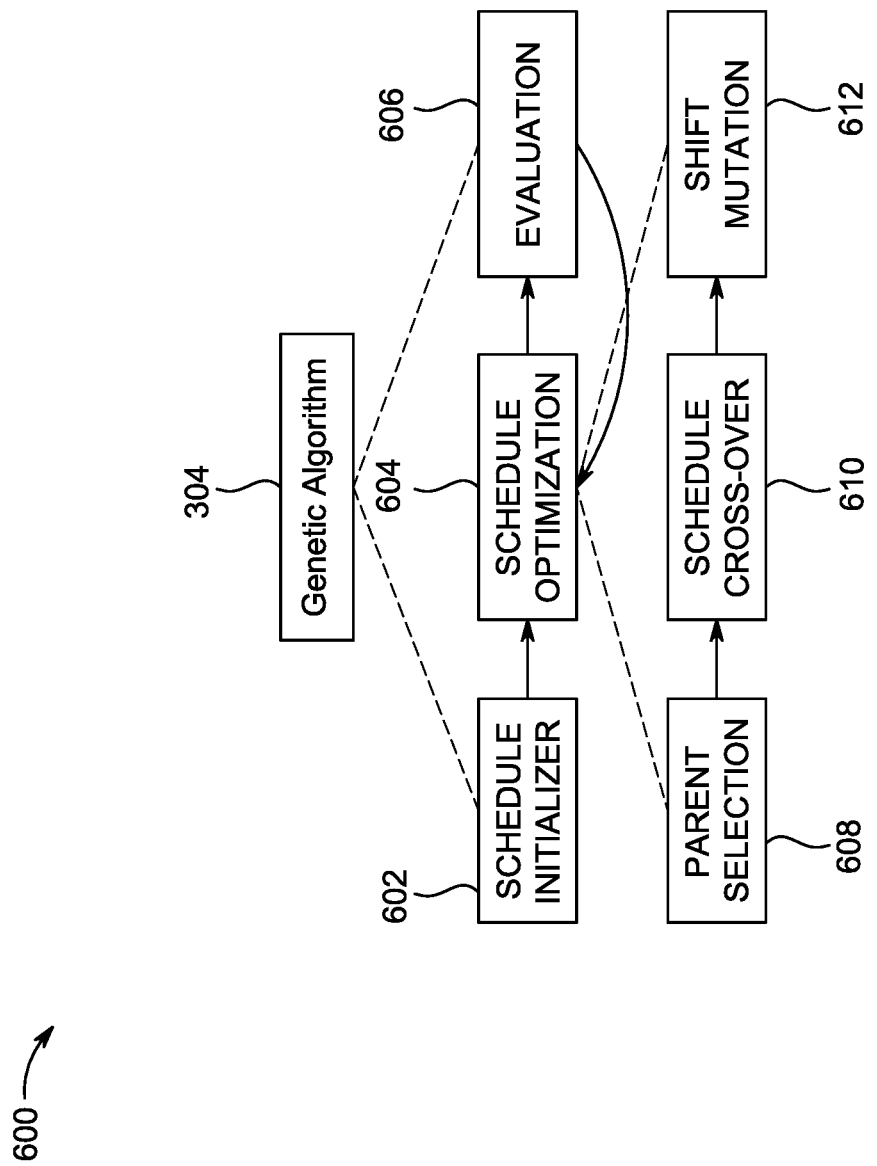
FIG. 6 illustrates a block diagram that shows components of genetic algorithm applied on scheduling nursing services, in accordance with an example embodiment.

FIG. 6 illustrates a block diagram that shows components of genetic algorithm applied on scheduling nursing services, in accordance with an example embodiment. In an embodiment, the genetic algorithm 600 as applied on scheduling nursing services, further comprises of a schedule initializer 602, a schedule optimization 604 and an evaluation module 606 which executes iteratively with the schedule optimization 604 module. In addition, the schedule optimization 604 has modules such as parent selection 608, schedule crossover 610 and shift mutation 612.

In an example embodiment, the genetic algorithm (GA) 302 can be utilized to generate optimal scheduling of nursing services in a hospital setting. The process involves three main components: a schedule initializer 602, a schedule optimization 604 module, and an evaluation 606 module. Mentioned below are each of these components contributes to producing optimal scheduling.

The schedule initializer 602 is responsible for creating an initial population of potential schedules. It randomly generates a set of candidate schedules, representing different combinations of shift assignments for nurses. The initializer 602 ensures that the generated schedules satisfy the hard constraints, such as minimum staffing requirements, nurse certifications, and legal regulations. This initial population serves as the starting point for the genetic algorithm's optimization process.

The schedule optimization 604 module applies genetic operators, including selection, crossover, and mutation, to iteratively improve the quality of schedules in the population. Mentioned below are how these operators are used.

The selection operator 608 identifies the most promising schedules from the current population based on their fitness values. Fitness is determined by evaluating each schedule's adherence to soft constraints, such as nurse preferences, skill matching, and fairness.

The crossover 610 operator combines pairs of selected schedules to create new offspring schedules. This process involves exchanging genetic information (shift assignments) between the selected schedules, producing new potential solutions.

The mutation operator 612 introduces small random changes in the shift assignments of individual schedules. This helps explore different regions of the solution space and prevents the algorithm from converging prematurely.

Through successive iterations of selection, crossover, and mutation, the optimization module gradually refines the population, favoring schedules that better adhere to the soft constraints and exhibit improved fitness. This optimization process aims to find schedules that maximize desirable criteria while satisfying the necessary constraints.

The evaluation module 612 assesses the fitness or quality of each schedule in the population. It uses an objective function or evaluation metric that quantifies how well a schedule satisfies the constraints and achieves the desired objectives. The evaluation module considers factors such as staffing levels, skill matching, nurse preferences, fairness, optimized demand assignments, and other relevant criteria. The objective function guides the selection process in the optimization module by assigning higher fitness values to schedules that better meet the defined objectives.

The genetic algorithm 304 iteratively repeats the steps of selection, crossover, mutation, and evaluation until a termination condition is met. This condition can be a specific number of generations, reaching a desired fitness threshold, or a predefined computational time limit. At the end of the optimization process, the genetic algorithm produces one or more optimal schedules that satisfy the defined constraints and maximize the defined objectives.

By combining the schedule initializer 602, the schedule optimization 604 module, and the evaluation 606 module, the genetic algorithm iteratively refines and improves schedules, ultimately producing optimal scheduling solutions for nursing services in a hospital setting.

Figure 7:
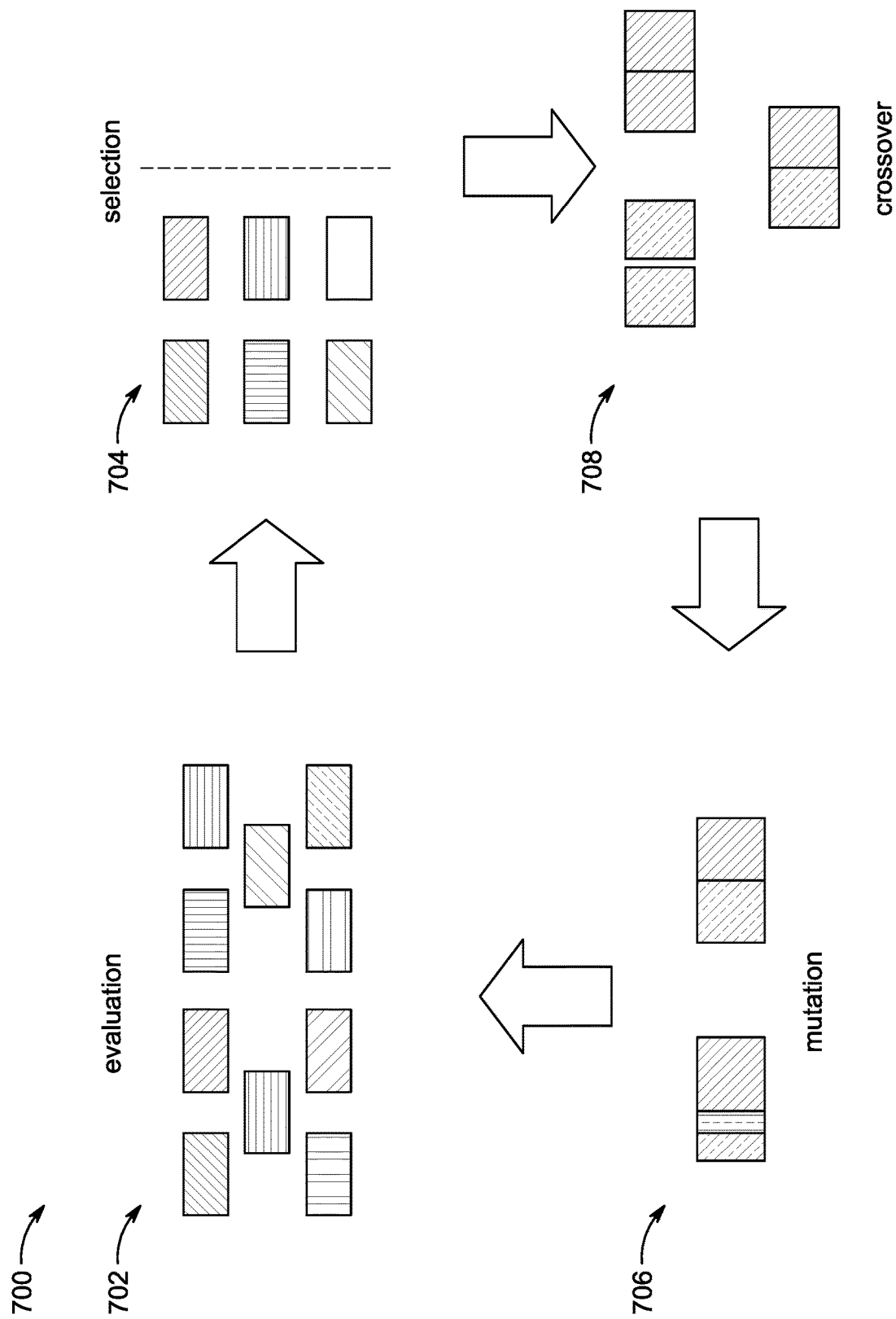
FIG. 7 illustrates a block diagram that shows a typical operation of genetic algorithm, in accordance with an example embodiment.

FIG. 7 illustrates a block diagram that shows a typical operation of genetic algorithm, in accordance with an example embodiment. The four main components of a genetic algorithm 700 are evaluation 702, selection 704, crossover 708 and mutation 706.

In an example embodiment, a genetic algorithm (GA) is a heuristic optimization algorithm inspired by the process of natural selection. It aims to find optimal solutions to complex problems by mimicking the principles of evolution. Mentioned below is how a typical genetic algorithm works through the steps of evaluation 702, selection 704, mutation 706, and crossover 708.

Evaluation 702: The first step of a genetic algorithm is to evaluate the fitness of each individual in the population. Each individual represents a potential solution to the problem at hand. The evaluation involves applying an objective function or fitness function to assess the quality or suitability of each individual solution. The fitness function quantifies how well an individual meets the desired objectives and satisfies the defined constraints. The evaluation assigns a fitness score or value to each individual, representing its quality or performance.

Selection 704: Once the fitness of all individuals is evaluated, the selection process begins. Selection aims to choose individuals with higher fitness scores to proceed to the next generation, simulating the survival of the fittest in natural evolution. There are various selection techniques, such as tournament selection, roulette wheel selection, or rank-based selection. These techniques give preferential treatment to individuals with higher fitness values while allowing some chance for less fit individuals to be selected. The selection process helps maintain diversity in the population and increases the likelihood of exploring promising areas of the solution space.

Mutation 706: Mutation introduces random changes in the genetic makeup (representation) of selected individuals. It helps to introduce new genetic information and explore different regions of the solution space. In a genetic algorithm, individuals are typically encoded as strings or arrays of genes, where each gene represents a variable or parameter of the problem. Mutation involves randomly modifying one or more genes in an individual, altering its solution representation. The mutation rate determines the probability of a gene being mutated. By introducing small random changes, mutation allows the algorithm to potentially discover new and better solutions that were not present in the initial population.

Crossover 708: Crossover, also known as recombination or mating, emulates the process of reproduction in natural evolution. It involves combining genetic information from selected individuals to create new offspring. Crossover typically takes place at specific crossover points in the individuals' representations. By exchanging or combining segments of genetic information between two or more selected individuals, crossover generates offspring solutions that inherit traits from their parents. This process promotes exploration and exploitation of promising regions in the solution space. The crossover rate determines the probability of crossover occurring between selected individuals.

The evaluation, selection, mutation, and crossover steps are iteratively performed over multiple generations until a termination condition is met. Termination conditions can be a maximum number of generations, reaching a satisfactory fitness threshold, or a predefined computational time limit. The process continues with each new generation, gradually improving the population's overall fitness and convergence towards optimal solutions.

By iteratively applying these steps, a genetic algorithm explores and refines the population, favoring individuals with higher fitness scores while introducing variation through mutation and creating new solutions through crossover. This iterative process allows the algorithm to search for optimal solutions in complex problem spaces and has been successfully applied in various fields, including optimization, scheduling, and machine learning.

Figure 8:
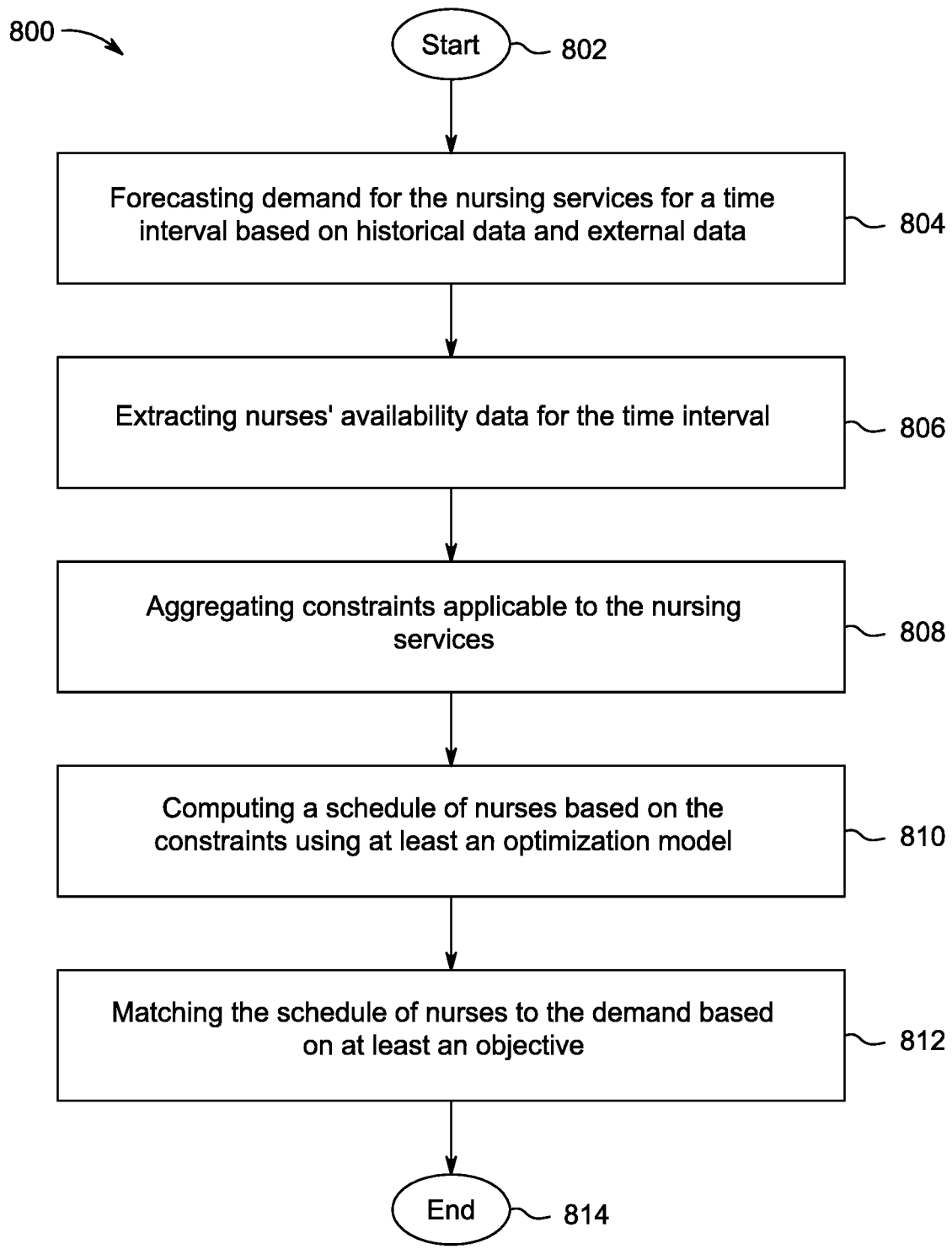
FIG. 8 shows a flow diagram for optimal scheduling of nursing services in a hospital, in accordance with an example embodiment.

FIG. 8 illustrates a method 800 for optimal scheduling of nursing services in a hospital, in accordance with an example embodiment. It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the evaluation system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 800 illustrated by the flow diagram of FIG. 800 for forecasting the demand for nursing services may start at step 802. The method 800 may include, at step 804, forecasting demand for the nursing services for a time interval based on historical data and external data.

In an example embodiment, forecasting the demand for nursing services based on historical data and external data involves several steps.

Data Collection: The first step is to gather historical data related to nursing services. This includes information on patient volumes, admissions, discharges, patient acuity, and other relevant factors. Additionally, external data sources such as demographic data, population trends, public health data, and healthcare utilization statistics can provide valuable insights for demand forecasting.

Data Preprocessing: Once the data is collected, it needs to be pre-processed to ensure its quality and compatibility for analysis. This involves data cleaning, which includes handling missing values, outliers, and inconsistencies. Data normalization or scaling may also be performed to bring the data into a consistent range or format for analysis.

Exploratory Data Analysis (EDA): EDA involves analyzing the collected data to understand its patterns, trends, and relationships. Various statistical techniques and visualizations can be used to identify seasonality, trends, and other patterns that may influence the demand for nursing services. EDA helps in gaining insights into the data and guiding subsequent modeling steps.

Feature Engineering: Feature engineering involves selecting or creating relevant features from the collected data that can be used to build forecasting models. These features can include time-related variables (e.g., day of the week, month), holidays, special events, patient demographics, and any other factors that may impact the demand for nursing services. Feature engineering aims to capture the important drivers of demand and enhance the accuracy of the forecasting models.

Modeling: Several forecasting models can be applied to predict the demand for nursing services. Common models include time series models like ARIMA (AutoRegressive Integrated Moving Average), machine learning models like XGBoost, LSTM (Long Short-Term Memory) neural networks, or regression-based models. The choice of the model depends on the characteristics of the data, the availability of external data, and the specific requirements of the forecasting task. It is important to split the historical data into training and testing sets to evaluate the performance of the models accurately.

Model Evaluation and Selection: Once the models are trained and tested, they need to be evaluated to determine their forecasting performance. Various evaluation metrics such as mean absolute error (MAE), mean squared error (MSE), or root mean squared error (RMSE) can be used to assess the accuracy of the models. The model with the best performance is selected for further use.

Forecasting and Monitoring: After selecting the best model, it can be used to generate future demand forecasts for nursing services. These forecasts can provide valuable insights for resource planning, staff allocation, and capacity management in a hospital setting. It is important to monitor the forecasting performance over time and periodically update the models as new data becomes available.

By combining historical data with external data sources, performing data preprocessing, conducting exploratory data analysis, engineering relevant features, and applying appropriate forecasting models, healthcare organizations can achieve accurate demand forecasting for nursing services. This enables them to make informed decisions and optimize resource allocation to meet the healthcare needs of patients effectively.

The method 800, at step 806, may include extracting nurses' availability data for the time interval.

In an example embodiment, to extract nurses' availability data, the following steps are executed.

Define the Required Information: Determine the specific availability information you need to extract from nurses. This may include their preferred working hours, days of the week they are available, specific time slots they can work, or any constraints they may have regarding their availability.

Design Data Collection Methods: Decide on the most suitable method for collecting nurses' availability data. This can vary depending on the size of the organization and the available resources. Common approaches include:

Surveys or questionnaires: Create a structured form or questionnaire to gather availability information directly from the nurses. This can be in a digital or physical format.

Online scheduling systems: If the organization uses an online scheduling system, nurses may input their availability directly into the system.

Manual input: If resources allow, one can assign staff members to collect availability information from nurses manually.

Collect Availability Data: Depending on the chosen method, start collecting the availability data from nurses. Ensure that the data collection process is well-organized and clearly documented. Encourage nurses to provide accurate and up-to-date information.

Validate and Verify Data: After collecting the availability data, review and validate it for accuracy and completeness. If possible, cross-check the collected data with the nurses themselves to ensure its reliability. Correct any inconsistencies or errors found during the validation process.

Store and Manage Data: Establish a system for storing and managing nurses' availability data. This can be a database, spreadsheet, or dedicated software. Ensure that the data is organized, securely stored, and easily accessible when needed.

Update and Maintain Data: Availability data may change over time due to various factors such as personal schedules, requests, or policy changes. Regularly update and maintain the data to reflect the current availability status of the nurses. Communicate with nurses periodically to gather any updates or changes to their availability.

The method 800, at step 808, may include aggregating constraints applicable to the nursing services.

In an example embodiment, in an example embodiment, In the context of optimal scheduling of nursing services, there are various hard and soft constraints that need to be considered. These constraints ensure compliance with regulations, address staff preferences, and ensure high-quality patient care. Below mentioned are some examples of hard and soft constraints:

Hard Constraints 404:
  Minimum Staffing Requirements: Hospitals must meet certain minimum staffing requirements mandated by regulatory bodies or accreditation standards to ensure patient safety and quality of care.
  Nurse Certifications and Qualifications: Assigning nurses to specific shifts or units based on their certifications and qualifications is a hard constraint. Certain units or patient populations require specialized training and skills.
  Legal and Contractual Obligations: Staffing schedules must adhere to labor laws, contractual agreements, and collective bargaining agreements governing working hours, breaks, overtime, and rest periods.
  Patient-to-Nurse Ratios: Hospitals must adhere to specific patient-to-nurse ratios defined by regulatory agencies or professional organizations. These ratios ensure appropriate staffing levels to deliver safe and effective care.
  Work Hour Restrictions: There are often limitations on the number of consecutive work hours, maximum hours per week, and mandatory rest periods between shifts to prevent fatigue-related errors and promote the well-being of nursing staff.

Soft Constraints 406:
  Nurse Preferences: Consideration of nurse preferences for specific shifts, days off, or work patterns is a soft constraint. Accommodating preferences can improve nurse satisfaction, morale, and work-life balance.
  Skills and Expertise: Assigning nurses to units or shifts based on their expertise or interest can improve patient outcomes and efficiency. Matching nurses' skills with patient acuity levels and unit requirements is a soft constraint.
  Shift Rotations and Fairness: Maintaining fairness in shift assignments and ensuring equitable distribution of desirable and less desirable shifts among nursing staff is important for morale and reducing dissatisfaction.
  Continuity of Care: Ensuring continuity of care for patients by assigning the same nurses to specific patients or units whenever possible can enhance communication, familiarity, and quality of care.
  Time-Off Requests: Considering time-off requests and granting reasonable time-off for nurses based on their personal needs and preferences is a soft constraint that promotes work-life balance.
  Seniority and Experience: Considering seniority or experience levels when making shift assignments can be a soft constraint, recognizing the value of expertise and providing growth opportunities for nurses.

The method 800, at step 810, may include computing a schedule of nurses based on the constraints using at least an optimization model.

In an embodiment, the optimization model is the genetic algorithm (GA) 302 which can be utilized to generate optimal scheduling of nursing services in a hospital setting. The process involves three main components: a schedule initializer 602, a schedule optimization 604 module, and an evaluation 606 module. Mentioned below are each of these components contributes to producing optimal scheduling.

The schedule initializer 602 is responsible for creating an initial population of potential schedules. It randomly generates a set of candidate schedules, representing different combinations of shift assignments for nurses. The initializer 602 ensures that the generated schedules satisfy the hard constraints, such as minimum staffing requirements, nurse certifications, and legal regulations. This initial population serves as the starting point for the genetic algorithm's optimization process.

The schedule optimization 604 module applies genetic operators, including selection, crossover, and mutation, to iteratively improve the quality of schedules in the population. Mentioned below are how these operators are used.

The selection operator 608 identifies the most promising schedules from the current population based on their fitness values. Fitness is determined by evaluating each schedule's adherence to soft constraints, such as nurse preferences, skill matching, and fairness.

The crossover 610 operator combines pairs of selected schedules to create new offspring schedules. This process involves exchanging genetic information (shift assignments) between the selected schedules, producing new potential solutions.

The mutation operator 612 introduces small random changes in the shift assignments of individual schedules. This helps explore different regions of the solution space and prevents the algorithm from converging prematurely.

Through successive iterations of selection, crossover, and mutation, the optimization module gradually refines the population, favoring schedules that better adhere to the soft constraints and exhibit improved fitness. This optimization process aims to find schedules that maximize desirable criteria while satisfying the necessary constraints.

The evaluation module 612 assesses the fitness or quality of each schedule in the population. It uses an objective function or evaluation metric that quantifies how well a schedule satisfies the constraints and achieves the desired objectives. The evaluation module considers factors such as staffing levels, skill matching, nurse preferences, fairness, patient-to-nurse ratios, and other relevant criteria. The objective function guides the selection process in the optimization module by assigning higher fitness values to schedules that better meet the defined objectives.

The genetic algorithm 304 iteratively repeats the steps of selection, crossover, mutation, and evaluation until a termination condition is met. This condition can be a specific number of generations, reaching a desired fitness threshold, or a predefined computational time limit. At the end of the optimization process, the genetic algorithm produces one or more optimal schedules that satisfy the defined constraints and maximize the defined objectives.

By combining the schedule initializer 602, the schedule optimization 604 module, and the evaluation 606 module, the genetic algorithm iteratively refines and improves schedules, producing optimal scheduling solutions for nursing services in a hospital setting.

In an example embodiment, reinforcement learning, and constraint programming may be used for optimal scheduling of nursing services. Mentioned below is how each approach can be applied.

Reinforcement Learning: Reinforcement learning (RL) is a machine learning technique that involves an agent learning from interactions with an environment to maximize a reward signal. In the context of scheduling nursing services, RL can be used to learn an optimal scheduling policy through trial and error. Here's how RL can be applied:

a. State Representation: The scheduling problem is defined in terms of a state representation that captures the relevant information about the current scheduling situation. This can include factors such as nurse availability, patient demand, skill requirements, and other constraints.

Action Space: Define a set of actions that the RL agent can take in each state. Actions represent the scheduling decisions, such as assigning nurses to shifts or adjusting the schedule.

Reward Design: Design a reward function that quantifies the quality of the schedule. The reward function should align with the objectives of the scheduling problem, such as minimizing overtime, ensuring fair distribution of shifts, or maximizing nurse preferences.

Training the RL Agent: The RL agent interacts with the environment by taking actions in states and receiving rewards. Through repeated iterations and exploration, the agent learns an optimal scheduling policy that maximizes the cumulative reward over time. Techniques like Q-learning, Deep Q-Networks (DQN), or Proximal Policy Optimization (PPO) can be employed.

Policy Deployment: Once the RL agent is trained, the learned policy can be used to generate optimal schedules for nursing services by taking actions based on the current state of the scheduling problem.

Constraint Programming: Constraint programming is a declarative programming paradigm that allows for modeling and solving combinatorial problems with complex constraints. It can be used for modeling and solving the constraints inherent in scheduling nursing services. Here's how constraint programming can be applied:

Constraint Modeling: Define the scheduling problem as a set of constraints. These constraints capture the various requirements and limitations, such as nurse availability, skill requirements, workload balance, and legal regulations.

Constraint Solver: Utilize a constraint solver to search for feasible solutions that satisfy all the constraints. Constraint programming solvers use powerful algorithms to systematically explore the solution space and find valid schedules.

Objective Function: Specify an objective function that quantifies the quality of the schedule. This can include factors like minimizing overtime, maximizing fairness, or optimizing patient-nurse ratios.

Optimization: Incorporate the objective function into the constraint programming model to find an optimal schedule that balances the constraints and optimizes the objective.

Iterative Refinement: Iterate the constraint programming process, adjusting constraints or objectives as needed to improve the schedule's quality and address specific requirements.

By combining reinforcement learning and constraint programming techniques, it is possible to leverage the strengths of each approach for optimal scheduling of nursing services. Reinforcement learning can learn from data and interactions to find effective scheduling policies, while constraint programming can handle complex constraints and optimize the scheduling solution. These techniques offer promising avenues for addressing the dynamic and complex nature of scheduling nursing services in a hospital setting.

The method 800, at step 812, may include matching the schedule of nurses to the demand based on at least an objective.

In an example embodiment, incorporating the objectives of operational cost minimization, nurses' work satisfaction maximization, and patient care quality maximization into the optimal scheduling of nursing services requires a multi-objective approach. Mentioned below are how these objectives can be incorporated.

Objective Function Formulation: Define an objective function that combines the multiple objectives into a single metric. This can be achieved using a weighted sum approach or a multi-objective optimization technique. Assign weights to each objective based on their relative importance to the organization and stakeholders.

For example, the objective function can be formulated as follows: Objective=w1*Cost+w2*Work Satisfaction+w3*Patient Care Quality Cost Minimization: To minimize operational costs, consider factors such as overtime hours, agency or temporary staffing costs, and unnecessary shift overlaps. The scheduling algorithm should aim to reduce these costs by optimizing shift assignments, minimizing overtime, and optimizing resource utilization.

Work Satisfaction Maximization: To maximize nurses' work satisfaction, consider their preferences and constraints. Consider factors such as preferred shift types, balanced workload distribution, consecutive days off, and minimizing undesirable shifts (e.g., night shifts or weekends). Incorporate these preferences, fairness, and constraints into the scheduling algorithm to ensure that nurses' work preferences are considered as much as possible.

Patient Care Quality Maximization: To maximize patient care quality, consider factors such optimal demand assignments, skill mix, and continuity of care. Ensure that the scheduling algorithm assigns nurses with the appropriate skills and experience to each unit or shift. Strive for an optimal patient-to-nurse ratio that ensures adequate care while considering the acuity and needs of the patients. Avoid frequent shift changes or excessive workload for nurses, as this can impact the quality of patient care.

Multi-Objective Optimization: When incorporating multiple objectives, it is important to balance the trade-offs between them. Use multi-objective optimization techniques such as Pareto optimization or evolutionary algorithms to generate a set of optimal schedules that represent different trade-off solutions. These solutions form a Pareto front, representing the best compromise between the objectives. Decision-makers can then select a solution from the Pareto front based on their preferences and priorities.

Sensitivity Analysis: Perform sensitivity analysis by adjusting the weights assigned to each objective in the objective function. This allows decision-makers to understand the impact of different weightings on the overall schedule and make informed decisions based on the trade-offs between cost, work satisfaction, and patient care quality.

By incorporating these objectives and utilizing multi-objective optimization techniques, healthcare organizations can strive to achieve optimal scheduling of nursing services that balances the operational cost, nurses' work satisfaction, and patient care quality.

In some example embodiments, a computer programmable product may be provided. The computer programmable product may comprise at least one non-transitory computer-readable storage medium having stored thereon computer-executable program code instructions that when executed by a computer, cause the computer to execute the method 800.

In an example embodiment, an apparatus for performing the method 800 of FIG. 8 above may comprise a processor (e.g., the processor 202) configured to perform some or each of the operations of the method 800. The processor may, for example, be configured to perform the operations (802-812) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (802-812) may comprise, for example, the processor 202 which may be implemented in the system 200 and/or a device or circuit for executing instructions or executing an algorithm for processing information as described above.

Figure 9:
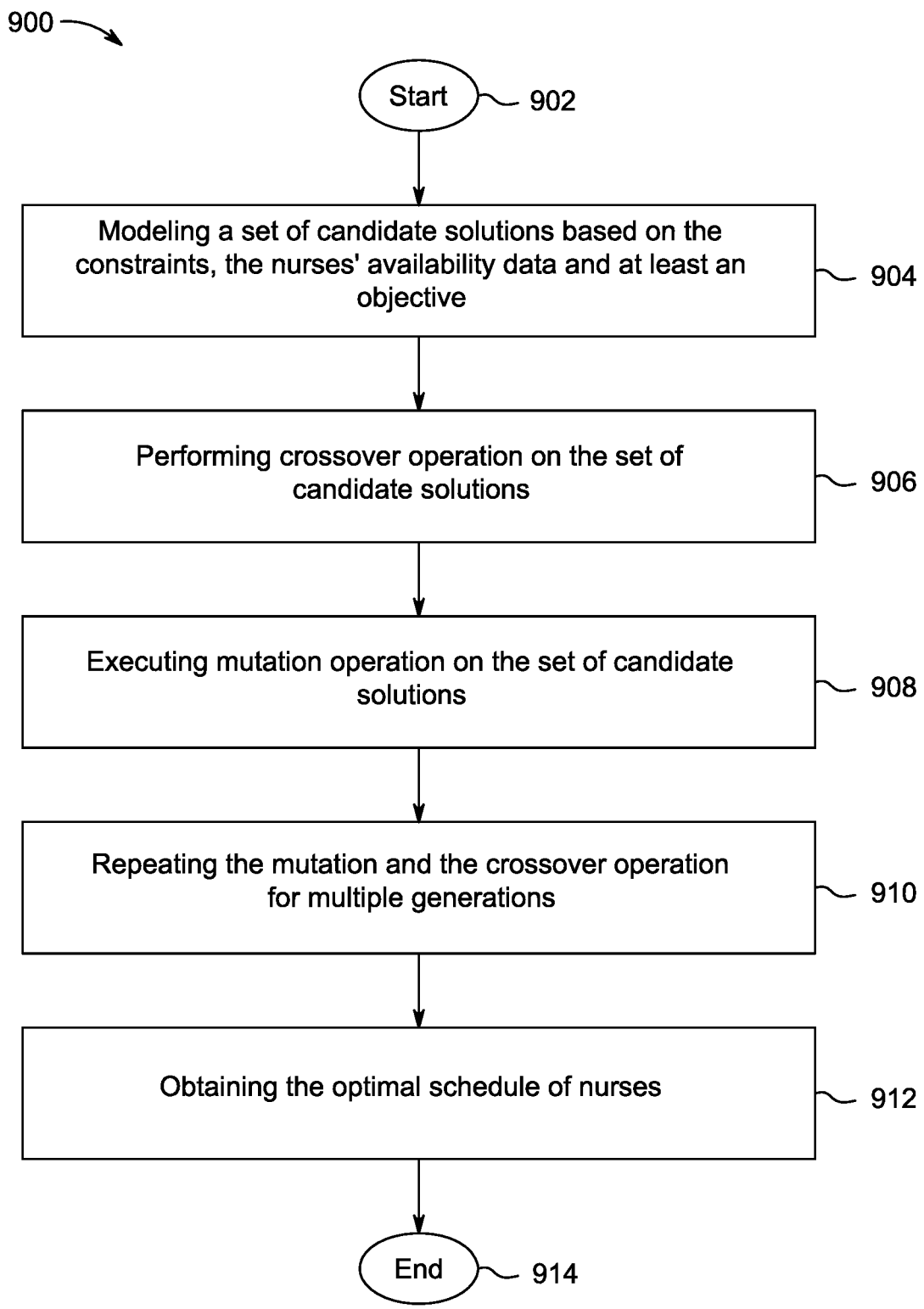
FIG. 9 shows a flow diagram that shows execution of genetic algorithm for scheduling nursing services, in accordance with an example embodiment.

FIG. 9 illustrates a method 900 for execution of genetic algorithm for scheduling nursing services, in accordance with an example embodiment. It will be understood that each block of the flow diagram of the method 900 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the evaluation system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 900 illustrated by the flow diagram of FIG. 900 for execution of genetic algorithm for scheduling nursing services starts at step 902.

The method at step 904, may include modeling a set of candidate solutions based on the constraints, the nurses' availability data and at least an objective.

In an embodiment, setting up candidate solutions for a genetic algorithm involves representing the schedules of nursing services in a suitable format that can be manipulated by the genetic operators. Mentioned below are how candidate solutions for a genetic algorithm in the context of optimal scheduling of nursing services are set up.

Define the Chromosome Representation: The first step is to define how a candidate solution, also known as an individual or chromosome, is represented in the genetic algorithm. The representation should capture the necessary information about the schedule. Common approaches include:

Binary Representation: Represent each shift or time slot as a binary value (0 or 1). For example, a chromosome of length N can represent N shifts, with a value of 1 indicating that a nurse is assigned to that shift, and 0 indicating no assignment.

Integer Representation: Assign unique integer values to each shift or time slot. For example, a chromosome of length N can represent N shifts, with each element containing an integer representing the assigned nurse ID or shift type.

Permutation Representation: Use a permutation of nurse IDs or shift types to represent the schedule. Each position in the chromosome corresponds to a specific shift or time slot.

Define the Population Size: The population size determines the number of candidate solutions that will be evaluated and evolved in each generation of the genetic algorithm. It is typically a parameter that needs to be set based on the problem's complexity and computational resources.

Generate Initial Population: Randomly generate an initial population of candidate solutions. This can be done by randomly assigning nurses to shifts or using any other appropriate method based on the chosen chromosome representation.

Evaluate Fitness: Assign a fitness value to each candidate solution in the population. The fitness function should quantify how well a particular schedule satisfies the objectives and constraints of the nursing services scheduling problem. For example, the fitness function could consider factors such as nurse preferences, patient-nurse ratios, workload balance, and compliance with legal regulations.

Iterative Evolution: The genetic algorithm proceeds through multiple iterations or generations to improve the quality of the candidate solutions. In each iteration, the following steps are performed:

Selection: Select a subset of candidate solutions from the population based on their fitness values. Solutions with higher fitness values are more likely to be selected for reproduction.

Genetic Operators: Apply genetic operators such as crossover and mutation to the selected solutions to create new offspring. These operators introduce variation and diversity in the population.

Evaluate Fitness: Assign fitness values to the newly generated offspring.

Replacement: Replace a portion of the existing population with the new offspring, ensuring that the population size remains constant.

Repeat: Repeat the above steps for a specified number of iterations or until a termination criterion is met (e.g., a maximum number of generations reached or convergence of the fitness values).

The genetic algorithm iteratively evolves the population, aiming to find candidate solutions that optimize the scheduling objectives and constraints. By iteratively applying selection, genetic operators, and fitness evaluation, the algorithm explores the search space and converges towards optimal or near-optimal solutions for the scheduling problem.

The method 900, at step 906, may include performing crossover operation on the set of candidate solutions.

In an embodiment, crossover is another genetic operator that combines genetic material from two or more individuals to create new offspring. It mimics the process of reproduction and genetic recombination. In the context of scheduling nursing services, the crossover operator can be applied to generate new schedules by combining the characteristics of existing schedules. The implementation steps are mentioned below.

Selecting Parents: Choose two or more individuals from the population as parents for crossover. These individuals represent schedules in the current generation.

Genetic Material Exchange: Exchange genetic material (such as shift assignments or working hours) between the selected parents to create new offspring. This can be done by selecting specific portions of the genetic material from each parent and combining them in the offspring.

Creating Offspring: Generate one or more offspring by applying the crossover operation. The offspring represent new schedules that inherit characteristics from their parents.

Maintaining Constraints: Ensure that the generated offspring satisfy the constraints of the scheduling problem. Validate the offspring to ensure nurse availability, skill requirements, and other relevant constraints are still met.

Diversity Enhancement: Crossover promotes diversity by creating offspring that possess combinations of traits from different parents. It enables exploration of the search space and can lead to the discovery of better solutions.

The method 900, at step 908, may include executing mutation operation on the set of candidate solutions.

In an embodiment, mutation is a genetic operator that introduces random changes to the genetic material of individuals in a population. In the context of scheduling nursing services, the mutation operator can be applied to modify certain attributes or characteristics of a schedule. Mentioned below is the implementation.

Selecting Individuals: Choose one or more individuals from the population for mutation. These individuals represent schedules in the current generation.

Modifying Genetic Material: Randomly alter certain elements of the selected individuals. This can include changing shift assignments, adjusting working hours, or modifying break schedules.

Maintaining Constraints: Ensure that the mutated individuals still satisfy the constraints of the scheduling problem. For example, consider nurse availability, skill requirements, and other relevant constraints while applying mutations.

Diversity Preservation: Mutation helps maintain diversity in the population by introducing novel solutions. It can prevent the population from converging prematurely to suboptimal solutions.

The method 900, at step 910, may include repeating the mutation and the crossover operation for multiple generations In an embodiment, repeating the mutation and crossover operations for multiple generations is essential for optimal scheduling of nursing services because it allows the genetic algorithm to explore and refine the population of candidate solutions over time.

Exploration of the Search Space: The mutation and crossover operations introduce variation and diversity into the population. By applying these operations repeatedly over multiple generations, the genetic algorithm explores different regions of the search space. This exploration is crucial for finding potentially better solutions that may be hidden or unexplored initially.

Exploitation of Promising Solutions: As the genetic algorithm progresses, it is expected to converge towards better solutions. The crossover operation allows for the combination of favorable characteristics from different individuals, potentially producing offspring with improved fitness. By repeating the crossover operation, the algorithm can exploit and refine these promising solutions, gradually improving the quality of the population.

Avoidance of Premature Convergence: Repeating the mutation and crossover operations helps prevent premature convergence to suboptimal solutions. If the algorithm were to halt after a single generation, it may miss out on exploring alternative regions of the search space that might contain better solutions. By continuing the iterative process, the genetic algorithm has a better chance of escaping local optima and reaching globally optimal or near-optimal solutions.

Adaptation to Changing Conditions: In the context of nursing services scheduling, conditions and requirements may change over time. By repeating the mutation and crossover operations, the genetic algorithm can adapt to these changes and adjust the population of candidate solutions accordingly. For example, if there are changes in nurse availability or patient demand, the algorithm can explore new possibilities through mutation and generate offspring with adjusted schedules via crossover.

Convergence to Optimal or Near-Optimal Solutions: Through multiple generations of mutation and crossover, the genetic algorithm refines the population, gradually improving the quality of the candidate solutions. Over time, it converges towards optimal or near-optimal schedules that satisfy the given objectives and constraints of the nursing services scheduling problem.

It is worth noting that the number of generations and the balance between exploration and exploitation should be carefully considered. Too few generations may lead to premature convergence, while too many generations may result in excessive computational resources being consumed. The genetic algorithm's performance can be monitored using convergence criteria, such as stability of fitness values or reaching a predefined threshold, to determine when to terminate the iterative process.

By repeating the mutation and crossover operations for multiple generations, the genetic algorithm ensures a comprehensive exploration of the search space, exploitation of promising solutions, adaptability to changing conditions, and convergence towards optimal or near-optimal schedules for the optimal scheduling of nursing services.

The method 900, at step 912, may include obtaining the optimal schedule of nurses.

In some example embodiments, a computer programmable product may be provided. The computer programmable product may comprise at least one non-transitory computer-readable storage medium having stored thereon computer-executable program code instructions that when executed by a computer, cause the computer to execute the method 900.

In an example embodiment, an apparatus for performing the method 900 of FIG. 9 above may comprise a processor (e.g., the processor 202) configured to perform some or each of the operations of the method 900. The processor may, for example, be configured to perform the operations (902-912) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (902-912) may comprise, for example, the processor 202 which may be implemented in the system 200 and/or a device or circuit for executing instructions or executing an algorithm for processing information as described above.

Figure 10:
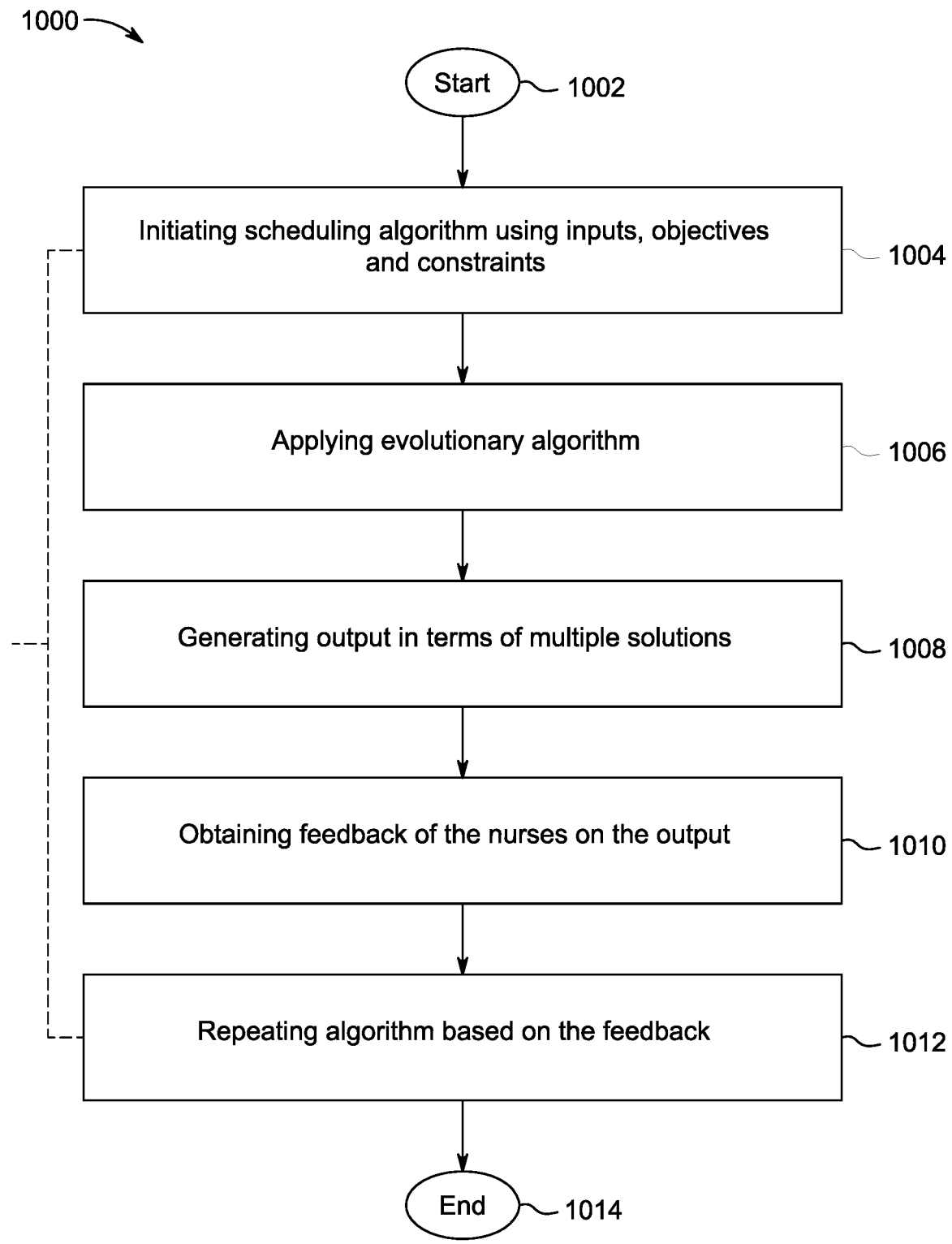
FIG. 10 shows a flow diagram of feedback based scheduling of nursing services, in accordance with an example embodiment.

FIG. 10 illustrates a method 1000 for execution of feedback-based scheduling of nursing services, in accordance with an example embodiment. It will be understood that each block of the flow diagram of the method 1000 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the evaluation system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 1000 illustrated by the flow diagram of FIG. 10 of feedback-based scheduling of nursing services may starts at step 1002.

The method 1000, at step 1004, may include initiating scheduling algorithm using inputs, objectives, and constraints. In an embodiment, the inputs may be the historical data and the external data. Further, the objectives are multiple such as but not limited to operational cost minimization, nurses' work satisfaction maximization and patient care quality maximization. Additionally, the constraints may be the hard constraints 404 may include but not limited to days off, minimum cover and contract and the soft constraints 406 may include but not limited to shift on, shift off and optional cover.

The method 1000, at step 1006, may include applying evolutionary algorithm. The evolutionary algorithm may be but not limited to genetic algorithm. In other example embodiments other models such as reinforcement learning, or constrained programming may be used.

The method 1000, at step 1008, may include generating output in terms of multiple solutions. Further, the multiple solutions may include insights on penalties and non-respected constraints.

The method 1000, at step 1010, may include obtaining feedback of the nurses on the output. In an embodiment, the feedback mechanism may include requesting nurses to rate schedules, A/B testing and thereby, using feedback to improve the model.

The method 1000, at step 1012 may include repeating algorithm based on the feedback.

In some example embodiments, a computer programmable product may be provided. The computer programmable product may comprise at least one non-transitory computer-readable storage medium having stored thereon computer-executable program code instructions that when executed by a computer, cause the computer to execute the method 1000.

In an example embodiment, an apparatus for performing the method 1000 of FIG. 10 above may comprise a processor (e.g., the processor 202) configured to perform some or each of the operations of the method 1000. The processor may, for example, be configured to perform the operations (1002-1008) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (902-910) may comprise, for example, the processor 202 which may be implemented in the system 200 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

What is claimed is:

1. A computer-implemented method for optimal scheduling of nursing services in a hospital, comprising:
   forecasting demand for the nursing services for a time interval based on historical data and external data;
   extracting nurses' availability data for the time interval;
   aggregating constraints applicable to the nursing services, wherein the constraints comprise at least one of regulatory requirements, contractual obligations, and nurse skill mix;
   computing a plurality of candidate schedules of nurses based on the constraints using a plurality of optimization models;
   ensembling the plurality of candidate schedules of nurses, based on weights assigned to each of a plurality of objectives defined in an objective function, to produce an ensemble schedule, wherein the objective function quantifies the schedule to satisfy the constraints and achieve the plurality of objectives, the plurality of objectives comprising at least one of patient care quality maximization, nurses' work satisfaction maximization, and patient safety and quality maximization;
   updating the forecasted demand during the time interval based on real-time hospital data;
   adjusting the weights assigned to the plurality of objectives based on the updated forecasted demand;
   re-ensembling the plurality of candidate schedules based on the adjusted weights of the plurality of objectives, to produce a revised ensemble schedule;
   matching the revised ensemble schedule to the updated forecasted demand based on at least the objective function; and
   outputting the revised ensemble schedule for the optimal scheduling of the nursing services.

2. The computer-implemented method of claim 1, wherein the plurality of objectives further comprises operational cost minimization.

3. The computer-implemented method of claim 2, wherein the nurses' work satisfaction is computed using feedback.

4. The computer-implemented method of claim 1, wherein each of the plurality of optimization models is at least one from a group comprising evolutionary algorithm, reinforcement learning, and constraint programming.

5. The method of claim 4, wherein the evolutionary algorithm is genetic algorithm.

6. The computer-implemented method of claim 5, wherein the genetic algorithm comprises:
   modeling a set of candidate solutions based on the constraints, the nurses' availability data, and at least an objective of the plurality of objectives;
   performing crossover operation on the set of candidate solutions;
   executing mutation operation on the set of candidate solutions; and
   repeating the mutation and the crossover operations for multiple generations to obtain the candidate schedule of nurses.

7. The computer-implemented method of claim 1, wherein the historical data of the hospital comprises at least one of patient orders, acuity levels, patients' census data including admissions and discharges and unit transfers, departmental data, ICD-10 data, and day of a week.

8. The computer-implemented method of claim 1, wherein the external data comprises at least one of historical pandemic data and weather data.

9. The computer-implemented method of claim 1, wherein the time interval comprises 20 minutes or a plurality of multiples of 20 minutes.

10. The computer-implemented method of claim 1, wherein the forecasting is online and real-time.

11. A computer system for optimal scheduling of nursing services in a hospital, the computer system comprising: one or more computer processors, one or more computer readable memories, one or more computer readable storage devices, and program instructions stored on the one or more computer readable storage devices for execution by the one or more computer processors via the one or more computer readable memories, the program instructions comprising:
   forecasting demand for the nursing services for a time interval based on historical data and external data;
   extracting nurses' availability data for the time interval;
   aggregating constraints applicable to the nursing services, wherein the constraints comprise at least one of regulatory requirements, contractual obligations, and nurse skill mix;
   computing a schedule of nurses based on the constraints using at least an optimization model and weights assigned to each of a plurality of objectives defined in an objective function, wherein the objective function quantifies the schedule to satisfy the constraints and achieve the plurality of objectives, the plurality of objectives comprising at least one of patient care quality maximization, nurses' work satisfaction maximization, and patient safety and quality maximization;

updating the forecasted demand during the time interval based on real-time hospital data;

adjusting the weights assigned to the plurality of objectives based on the updated forecasted demand;

computing an updated schedule of nurses based on the adjusted weights of the plurality of objectives;

matching the updated schedule to the updated forecasted demand based on at least the objective function; and outputting the updated schedule for the optimal scheduling of the nursing services.

12. The computer system of claim 11, wherein the plurality of objectives further comprises operational cost minimization.

13. The computer system of claim 12, wherein the nurses' work satisfaction is computed using feedback.

14. The computer system of claim 11, wherein the optimization model is at least one from a group comprising evolutionary algorithm, reinforcement learning, and constraint programming.

15. The computer system of claim 14, wherein the evolutionary algorithm is genetic algorithm.

16. The computer system of claim 15, wherein the genetic algorithm comprises:

modeling a set of candidate solutions based on the constraints, the nurses' availability data, and at least an objective of the plurality of objectives;

performing crossover operation on the set of candidate solutions;

executing mutation operation on the set of candidate solutions; and repeating the mutation and the crossover operations for multiple generations to obtain the schedule of nurses.

17. The computer system of claim 11, wherein the historical data of the hospital comprises at least one of patient orders, acuity levels, patients' census data including admissions and discharges and unit transfers, departmental data, ICD-10 data, and day of a week.

18. The computer system of claim 11, wherein the external data comprises at least one of historical pandemic data and weather data.

19. The computer system of claim 11, wherein the forecasting is online and real-time.

20. A non-transitory computer readable storage medium having stored thereon one or more computer executable instructions which when executed by one or more processors, cause the one or more processors to carry out operations for optimal scheduling of nursing services in a hospital, the operations comprising:

forecasting demand for the nursing services for a time interval based on historical data and external data;

extracting nurses' availability data for the time interval;

aggregating constraints applicable to the nursing services, wherein the constraints comprise at least one of regulatory requirements, contractual obligations, and nurse skill mix;

computing a schedule of nurses based on the constraints using at least an optimization model and weights assigned to each of a plurality of objectives defined in an objective function, wherein the objective function quantifies the schedule to satisfy the constraints and achieve the plurality of objectives, the plurality of objectives comprising at least one of patient care quality maximization, nurses' work satisfaction maximization, and patient safety and quality maximization;

updating the forecasted demand during the time interval based on real-time hospital data;

adjusting the weights assigned to the plurality of objectives based on the updated forecasted demand;

computing an updated schedule of nurses based on the adjusted weights of the plurality of objectives;

matching the updated schedule to the updated forecasted demand based on at least the objective function; and outputting the updated schedule for the optimal scheduling of the nursing services.

* * * * *